(12) United States Patent
Steinmacher-Burow

(10) Patent No.: US 10,891,228 B2
(45) Date of Patent: Jan. 12, 2021

(54) CACHE LINE STATES IDENTIFYING MEMORY CACHE

(71) Applicant: International Business Machines Corporation, Armonk, NY (US)

(72) Inventor: Burkhard Steinmacher-Burow, Esslingen am Neckar (DE)

(73) Assignee: International Business Machines Corporation, Armonk, NY (US)

( * ) Notice: Subject to any disclaimer, the term of this patent is extended or adjusted under 35 U.S.C. 154(b) by 118 days.

(21) Appl. No.: 15/894,019

(22) Filed: Feb. 12, 2018

(65) Prior Publication Data

US 2019/0251029 A1    Aug. 15, 2019

(51) Int. Cl.
*G06F 12/0808* (2016.01)
*G06F 12/0817* (2016.01)

(52) U.S. Cl.
CPC .. *G06F 12/0808* (2013.01); *G06F 2212/1032* (2013.01)

(58) Field of Classification Search
CPC .............. G06F 12/0808; G06F 2212/1032
See application file for complete search history.

(56) References Cited

U.S. PATENT DOCUMENTS

| | | | | |
|---|---|---|---|---|
| 6,553,376 B1* | 4/2003 | Lewis | ................. | H04L 65/1043 |
| 7,127,561 B2* | 10/2006 | Hill | ..................... | G06F 12/0808 |
| | | | | 711/145 |
| 7,475,321 B2* | 1/2009 | Gurumurthi | ........ | G06F 11/0793 |
| | | | | 707/999.003 |
| 8,180,981 B2* | 5/2012 | Kapil | ...................... | G06F 12/08 |
| | | | | 365/185.08 |
| 8,364,898 B2* | 1/2013 | Balakrishnan | ...... | G06F 12/0808 |
| | | | | 711/122 |
| 8,443,150 B1* | 5/2013 | de la Iglesia | ....... | G06F 12/0862 |
| | | | | 711/118 |
| 8,504,766 B2* | 8/2013 | Young | ................. | G06F 12/0804 |
| | | | | 711/113 |
| 8,868,837 B2 | 10/2014 | Gara et al. | | |
| 9,026,738 B2 | 5/2015 | Kato | | |
| 9,356,602 B1 | 5/2016 | Bielich et al. | | |
| 9,516,144 B2* | 12/2016 | Mosko | .................... | H04L 69/22 |
| 9,565,137 B2* | 2/2017 | Edmiston | ................ | H04L 69/12 |
| 9,680,765 B2* | 6/2017 | Kaul | ..................... | H04L 47/724 |

(Continued)

FOREIGN PATENT DOCUMENTS

WO    WO 2017/052764 A1    3/2017

OTHER PUBLICATIONS

Anonymous, "Comparison Between Store-and-Forward Switching and Cut-Through Switching", Nov. 2, 2017, pp. 1-6, https://community.fs.com/blog/comparison-between-store-and-forward-switching-and-cut-through-switching.html (Year: 2017).*

(Continued)

*Primary Examiner* — Christopher D Birkhimer
(74) *Attorney, Agent, or Firm* — David M. Quinn

(57) ABSTRACT

A cache memory control device for controlling a first cache memory of a multi-cache memory system that includes logic circuitry operable for storing state information assigned to an invalid copy of a cache line stored in the first cache memory, where the state information includes a cache memory identifier identifying an individual second cache memory of the multi-cache memory system that is likely to contain a valid copy of the cache line.

18 Claims, 9 Drawing Sheets

| State field of each cache entry has one of following values: | |
|---|---|
| 3-bit value | Meaning |
| 011 | M |
| 010 | E |
| 001 | S |
| 000 | I |
| 100 | I(1) |
| 101 | I(2) |
| 110 | I(3) |

(56) References Cited

U.S. PATENT DOCUMENTS

| | | | |
|---|---|---|---|
| 9,697,121 B2* | 7/2017 | Bradbury | G06F 9/467 |
| 9,812,221 B1* | 11/2017 | Hagen | G11C 29/38 |
| 9,838,440 B2* | 12/2017 | Wiley | H04L 29/06027 |
| 9,892,803 B2* | 2/2018 | Reed | G06F 12/084 |
| 9,898,331 B2* | 2/2018 | Bradbury | G06F 9/467 |
| 9,898,407 B2* | 2/2018 | Ambroladze | G06F 12/0815 |
| 9,911,508 B2* | 3/2018 | Hooker | G06F 12/084 |
| 2002/0053004 A1* | 5/2002 | Pong | G06F 12/0817 |
| | | | 711/119 |
| 2003/0097531 A1* | 5/2003 | Arimilli | G06F 12/0831 |
| | | | 711/146 |
| 2004/0039880 A1* | 2/2004 | Pentkovski | G06F 12/0811 |
| | | | 711/146 |
| 2005/0108776 A1* | 5/2005 | Carver | G06Q 30/0251 |
| | | | 725/135 |
| 2006/0156155 A1* | 7/2006 | Gurumurthi | G06F 11/0793 |
| | | | 714/746 |
| 2010/0191916 A1* | 7/2010 | Balakrishnan | G06F 12/0808 |
| | | | 711/134 |
| 2010/0293420 A1* | 11/2010 | Kapil | G06F 12/08 |
| | | | 714/710 |
| 2010/0318741 A1 | 12/2010 | Scott et al. | |
| 2011/0258376 A1* | 10/2011 | Young | G06F 12/0804 |
| | | | 711/113 |
| 2013/0111139 A1* | 5/2013 | Balakrishnan | G06F 12/0808 |
| | | | 711/122 |
| 2014/0044111 A1* | 2/2014 | Nuti | H04L 45/40 |
| | | | 370/338 |
| 2015/0186275 A1 | 7/2015 | Moga et al. | |
| 2015/0271072 A1* | 9/2015 | Moreman | H04L 65/4084 |
| | | | 709/213 |
| 2015/0373162 A1* | 12/2015 | Mosko | H04L 69/22 |
| | | | 370/392 |
| 2017/0031821 A1 | 2/2017 | Ramanujan et al. | |
| 2017/0109282 A1 | 4/2017 | Frank et al. | |
| 2017/0344480 A1* | 11/2017 | Beard | G06F 12/0833 |
| 2018/0011768 A1* | 1/2018 | Bradbury | G06F 11/1474 |

OTHER PUBLICATIONS

Techopedia, "Cut-Through Switching", Jul. 3, 2014, pp. 1, https://web.archive.org/web/20140801000000/https://www.techopedia.com/definition/18641/cut-through-switching (Year: 2014).*

H. Q. Le et al., *IBM POWER6 microarchitecture*, IBM J. Res. & Dev., vol. 51, No. 6, International Business Machines Corporation, dated Nov. 2007, 24 pages.

W. K. Starke et al., *The cache and memory subsystems of the IBM Power8 processor*, IBM J. Res. & Dev., vol. 59, No. 1, Paper 3, International Business Machines Corporation, dated Jan./Feb. 2015, 13 pages.

Wikipedia, *Cut-through switching*, <https://en.wikipedia.org/w/index.php?title=Cut-through_switching&oldid=811683607>, printed Dec. 15, 2017, 3 pages.

* cited by examiner

| State field of each cache entry has one of following values: ||
|---|---|
| 3-bit value | Meaning |
| 011 | M |
| 010 | E |
| 001 | S |
| 000 | I |
| 100 | I(1) |
| 101 | I(2) |
| 110 | I(3) |

FIG. 3

CACHE LINE STATES IDENTIFYING MEMORY CACHE

BACKGROUND

The present disclosure relates to the field of computer systems. More particularly, to a cache memory control device, a semiconductor circuit and a method for controlling a first cache memory of a multi-cache memory system.

Modern computer systems may comprise a memory architecture, which comprises a plurality of cache memories for caching and processing a large amount of data. Such cache memories may constitute a multi-cache memory system. An important issue for fast data processing may be the retrieval of data from the cache memories. Retrieving such data in general may take a significant amount of time relative to the average time required for executing instructions and processing the data. In order to enable a fast and efficient data processing, there is a continuous need to improve the performance of data transmission and retrieval.

SUMMARY

Various embodiments provide a cache memory control device, a semiconductor circuit and a method for controlling a first cache memory of a multi-cache memory system. Advantageous embodiments are described in the dependent claims. Embodiments of the present invention can be freely combined with each other if they are not mutually exclusive.

In one aspect, the invention relates to a cache memory control device for controlling a first cache memory of a multi-cache memory system. The control device comprises logic circuitry operable for storing state information assigned to an invalid copy of a cache line stored in an entry of the first cache memory. The state information comprises a cache memory identifier identifying an individual second cache memory of the multi-cache memory system that is likely to contain a valid copy of the cache line.

In a further aspect, the invention relates to a semiconductor circuit for controlling a first cache memory of a multi-cache memory system. The semiconductor circuit is operable for storing state information assigned to an invalid copy of a cache line stored in the first cache memory. The state information comprises a cache memory identifier identifying an individual second cache memory of the multi-cache memory system that is likely to contain a valid copy of the cache line.

In a further aspect, the invention relates to a method for controlling a first cache memory of a multi-cache memory system. The method comprises storing state information assigned to an invalid copy of a cache line stored in the first cache memory. The state information comprises a cache memory identifier identifying an individual second cache memory of the multi-cache memory system that is likely to contain a valid copy of the cache line.

BRIEF DESCRIPTION OF THE SEVERAL VIEWS OF THE DRAWINGS

In the following, embodiments of the invention are explained in greater detail, by way of example only, making reference to the drawings in which:

FIG. 3 depicts a table of exemplary state values.

DETAILED DESCRIPTION

Figure 1:
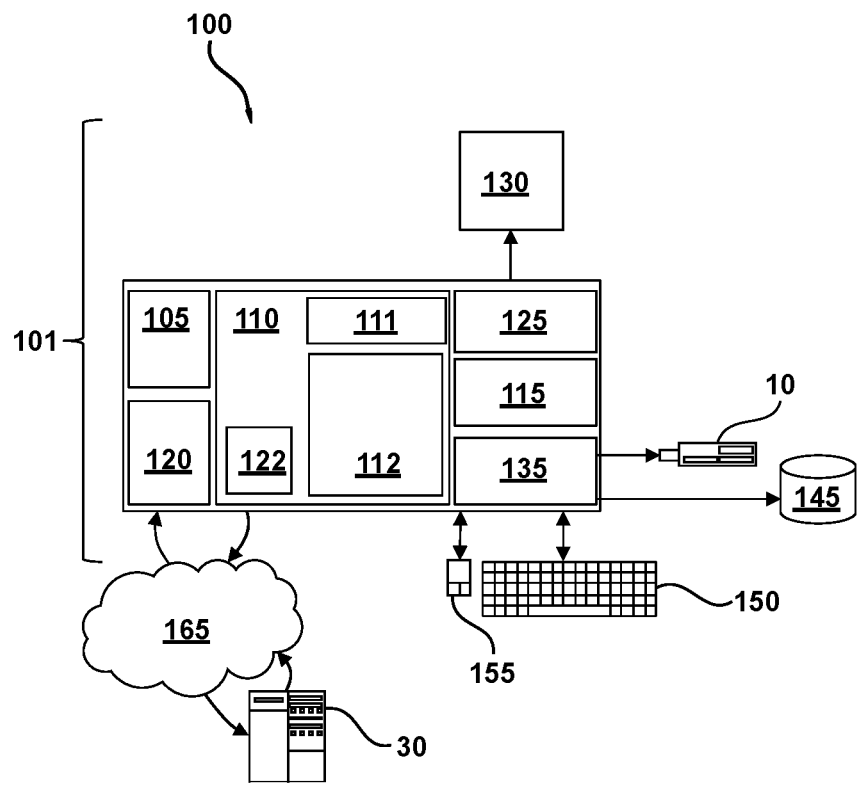
FIG. 1 depicts a schematic diagrams of an exemplary computer system suited for implementing a multi-cache memory system.

The descriptions of the various embodiments of the present invention are being presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

A cache memory temporarily stores data in order to enable faster serving of future requests for that data. Data stored in a cache may be a copy, i.e. duplication, of data stored elsewhere, e.g. in a main memory. A cache hit occurs when the requested data can be found in a cache, while a cache miss occurs when the requested data cannot be found in the cache. Cache hits are served by reading data from the cache, which is faster than reading the data from a slower data store, like e.g. a main memory. Thus, using cache memories may speed up the system performs of a computer system.

In order to provide data by a cache memory, the data is transferred between a backing storage, like e.g. main memory, and the cache memory in blocks, each block of fixed size. Such a data block is referred to as a cache line, a cache block, a memory line, or a memory block. When a cache line is copied from main memory into the cache memory, a cache entry is created. The cache entry may comprise the copied data, i.e. cache line, as well as the requested location in the backing storage, i.e. address tag.

When a cache client, like e.g. a processor, needs to read or write a location in backing storage, it may first check for a corresponding entry in the cache memory. The cache memory checks all cache entries for the address tag of the requested backing storage location. In case of a cache hit, i.e. a cache entry comprising the address tag sought, the processor may immediately read or write the data in the cache entry with the desired address tag and thus modifying the cache line stored therein. In case of a cache miss, the cache memory may allocate a new cache entry and copy a cache line assigned with the sought address tag from another cache memory of another cache client or from the backing memory into the new cache entry. Then, the request may be fulfilled from the content of the new cache entry of the cache memory.

Caching may realize a performance increase for transfers of data, in particular of data that is being repeatedly transferred. For example, a cache memory may realize a performance increase upon an initial transfer of a cache line, due to buffering occurring within a cache memory. Further, a cache memory may realize performance increase due to retrieving a cache line from a main memory and storing the same in a faster intermediate cache memory such that the respective cache line in case of repeated requested may be retrieved from the faster intermediate cache memory rather than the main memory. In addition, a cache memory may realize a performance increase of writing an amended cache line by virtue of storing the cache line immediately in the intermediate cache memory and deferring a transfer of the respective cache line to the main memory at a later stage. Alternatively, transfer of the respective cache line to the main memory may occur as a background process.

A cache memory may comprise is a plurality of entries. Each entry may comprise cache data, i.e. a cache line, which is a copy of data in some backing storage, like e.g. a main memory. Each entry may further comprise an address tag, which identifies the data comprised by the entry, i.e. the cache line. More precisely, the address tag may identify the data stored in the backing storage of which the respective cache entry is a copy. In case of a write access to the respective cache entry, the cache line may be amended and thus represent an amended copy of some data stored in the backing storage. After amending of a cache line in the cache memory, the data in the in the backing storage of which the respective cache line is a copy may be updated using a cache coherence protocol in order to ensure coherence between the cache line stored in the cache memory and the corresponding data stored in the backing storage. In addition, each entry may comprise state information identifying a state of the data stored in the respective entry, i.e. the cache line.

When the cache client, like e.g. a processor core or processor chip, needs to access data presumed to be stored in the backing storage, it may first check one or more cache memories. If an entry can be found within one of these cache memories with an address tag matching the address tag of the requested cache line, the cache line provided by the respective cache memory entry may be used instead of the corresponding data stored in the backing storage. This situation is referred to as a cache hit. In case of a cache miss, i.e. when no entry with the respective address tag of the desired cache line can be found in the one or more cache memories, the desired uncached data is retrieved from the backing storage. The uncached data retrieved from the backing storage during miss handling may e.g. be copied into a cache memory, thus enabling a cache hit in case of a further access attempt.

In order to maintain consistency between the one or more cache memories and the main memory, as well as between different cache memories, a caching process may have to adhere to a cache coherency protocol.

In computer architecture, cache coherence refers to a uniformity of shared resource data that is stored in a plurality of cache memories of a multi-cache memory system. Maintaining cache coherence may be of particular importance in multi-cache memory system.

In a multi-cache memory system, e.g. in form of a shared memory multiprocessor system with at least one separate cache memory for each processor, it may be possible to have many copies of the same shared cache line: for example, one copy in the main memory and one in each of one or more of the local cache memories of the processors that requested a copy of the respective cache line. When one of the copies is changed, the other copies have to reflect that change. Cache coherence is the discipline which ensures that changes of copies of cache lines in the cache memories are propagated throughout the system in a timely fashion.

The multi-cache memory system may comprise a plurality of cache memories. According to embodiments, the multi-cache memory system may be provided in form of an electronical data processing system, like e.g. a computer. For example, the respective electronical data processing system comprises one or more multi-core processors. Each multi-core processor comprises two or more independent processing units, i.e. cores, which read and execute program instructions. Each of these cores may be provided with a local cache memory, i.e. an individual cache memory for caching data used by the respective core. According to embodiments, a local cache memory may only be accessible via the core to which it is assigned.

According to a further example, the electronical data processing system may comprise a plurality of processor chips. Two or more of the processor chips may each comprise a local cache memory, i.e. an individual cache memory only accessible via a processor comprised by the processor chip assigned to the respective cache memory.

Embodiments may have the beneficial effect of providing cache memory identifiers for invalid cache lines stored in the cache memories of the multi-cache memory system. Each of the cache memory identifiers identifies for the invalid cache line to which it is assigned an individual second cache memory of the multi-cache memory system that is likely to contain a valid copy of the cache line. For example, when invalidating a cache line stored in a cache memory, it is determined whether a valid copy of the invalidated cache line is stored in and/or moved to another cache memory. In case such another cache memory is determined, the respective cache memory is identified as the cache memory which is likely to contain a valid copy of the cache line. The likelihood of containing the valid copy of the cache line may be time-dependent. When invalidating the respective cache line and adding the cache memory identifier to the state information of the invalidated cache line, it may be sure that the cache memory identified by the cache memory identifier indeed comprises a valid copy of the respective cache line. However, the more time passes the smaller the likelihood of still containing the valid copy of the cache line may become for the identified cache memory. Cache memories store copies of cache lines for use. The more time passes the higher the likelihood becomes that the cache memory has finished using the respective valid copy of the cache line and/or that meanwhile one or more other cache memories have requested a valid copy of the cache line. Each of these cases may result in an invalidation of the copy of the cache line comprised by the identified cache memory.

The cache memory identifier may enable to increase the performance of data retrieval due to a lower latency in case of a successful speculation of the current storage location of a valid copy of the memory line. In case a cache miss, due to an invalidity of a cache line requested from a cache memory, the cache memory identifier may be used to identify an individual cache memory that is likely to contain a valid copy of the cache line. A speculative request for retrieval of the valid copy of the cache line may be sent directly to the cache memory identified by the cache memory identifier.

In case cache coherence is implemented using a cache coherence directory, the request for retrieval of the valid copy of the cache line may thus be sent directly to a single individual cache memory likely containing a valid copy of the desired cache line instead of being sent to the respective cache coherence directory first in order to identify whether a valid copy of the requested cache line is currently stored in one of the cache memories and to forward the request to the respective cache memory. By saving the detour via the cache coherence directory the desired cache line may be retrieved faster and thus the latency may be reduced.

In case cache coherence is implemented using a broadcasted cache coherence protocol, the request for retrieval of the valid copy of the cache line may thus be sent directly to a single individual cache memory likely containing a valid copy of the desired cache line instead of broadcasting the request to all other cache memories or at least a plurality of other cache memories.

Broadcast based protocols may be faster than directory based protocols, if enough bandwidth is available, since all transactions comprise a request/response seen by all processors. A drawback of a broadcast based protocol is its lack of scalability. Every request has to be broadcast to all nodes in the system, i.e. all the cache memories, meaning that as the system gets larger, the required bandwidth for implementing the method grows.

Cache coherence may e.g. be implemented using an invalidate-based cache coherence protocol, like e.g. MESI or modifications such as H-MESI, MOESI, MESIF or MERSI.

According to the MESI each cache entry is assigned with one of following four possible states: modified, exclusive, shared, and invalid. The state is e.g. indicated using two additional bits. "Modified" identifies a cache line which is present only in the current cache memory and which is dirty, i.e. has been amended compared with the corresponding data line stored in the main memory. Therefore, the cache memory is required to write the modified cache line back to main memory before any other read of the no longer valid data line stored in the main memory state is permitted. The write-back of the respective cache line may change the state of the cache line from modified to shared.

"Exclusive" identifies a cache line is present only in the current cache memory and which is clean, i.e. which still matches the corresponding data lines stored in main memory. The exclusive state may be changed to shared state e.g. in response to receiving a read request from another cache memory. When receiving such a read request, a copy of the requested cache line may be sent to the requesting cache memory as a shared cache memory line and the state of the copied cache memory line remaining in cache memory may be changed to shared. The state of respective cache line may e.g. be changed from exclusive to modified if it is written to the respective cache line.

"Shared" identifies a cache line which may be stored in a plurality of cache memories and which is clean.

"Invalid" identifies a cache entry which is unused and not to be used to satisfy a memory access. The state of a cache line in a cache memory may be changed e.g. from shared to invalid if a copy of the respective cache line is requested by another cache memory as an exclusive cache line. For example, the shared copy of the respective cache line may be forwarded as an exclusive copy, while the remaining copied cache line is invalidated in order to avoid incoherence, i.e. that different cache memories are using different copies of the same cache line. In case an invalid cache line is to be read, a valid copy of the same, i.e. shared or exclusive has to be read from another cache memory or from the main memory.

According to embodiments, the multi-cache memory system may for example comprise N cache memories. In case of an invalidate-based cache coherence protocol, like e.g. the MESI protocol, the single invalid state may be extended to N+1 possible invalid states: I, I(1), I(2), I(N). The state I e.g. may not comprise any cache memory identifier. Thus, state I may indicate that the respective cache line to which state I is assigned is invalid and that none of the further cache memories of the multi-cache memory system is known to likely comprise a valid copy of the respective invalid cache line. State I(k) with $k \in \{1, \ldots, N\}$ may comprise a cache memory identifier k identifying cache memory k to be likely to comprise a valid copy of the respective invalid cache line. Considering a multi-cache memory system comprising N=16 cache memories, a 5-bit field would be sufficient to implement an invalid state with a cache memory identifier for each of the cache memories.

According to embodiments, the single invalid state may be extended to N rather than N+1 possible invalid states, with possible states I(k) for all cache memories 1 to N except for the local cache memory in which the invalid copy of the cache line assigned with the respective state information is stored. Thus, the number of possible cache line states in the state fields of the cache entries may be decreased by 1.

According to embodiments, the logic circuitry is further operable for providing the invalid copy of the cache line with the assigned state information. The providing comprises invalidating a valid copy of the cache line stored in the first cache memory upon receipt of a predefined command. The valid copy of the cache line is assigned with a state information indicating that the respective copy of the cache line stored in the first cache memory is valid. Furthermore, the received command is used to determine the second cache memory that is likely to contain the valid copy of the cache line after invalidation of the copy of the cache line stored in the first cache memory. The state information of the invalidated copy of the cache line is updated with the cache memory identifier identifying the second cache memory.

An exclusive request from the second cache memory may e.g. trigger the invalidation of a valid copy of the cache line stored in the first cache memory and identify the second cache memory to be likely to contain the valid copy of the cache line after invalidation of the copy of the cache line stored in the first cache memory. Therefore, the state information of the invalidated copy of the cache line may be updated with the cache memory identifier identifying the second cache memory, e.g. I(2).

The predefined command may e.g. be a data cache block invalidate command dcbix(address tag, X) identifying a cache line assigned with the address tag to be invalidated as well as a second cache memory X that is likely to contain a valid copy of the cache line after invalidation of the copy in the first cache memory. In other words, the first cache memory may already comprise a cache entry with the requested address tag. According to embodiments, a command dcbixe(address tag, X) may be received, which may establish, i.e. generate, an entry in the cache memory comprising the respective address tag and identifying a second cache memory X that is likely to contain a valid copy of the cache line assigned with the respective address tag. In this case, no valid copy of a cache line stored in the cache memory is invalidated, but rather a cache entry, e.g. with an invalid copy of the respective cache line, is generated in the cache memory which indicates in which cache memory a valid copy of the cache line assigned with the respective address tag may likely be found. Since the data comprised by an invalid copy of a cache line is not to be used, it is irrelevant which data is actually comprised by the invalid copy. It may indeed be an invalid copy of the respective cache line or some other data, e.g. random data or data comprising additional information.

According to embodiments, the single invalid state of an invalidate-based cache coherence protocol may be extended by only one additional state IX, indicating that the copy of the respective cache line is invalid and that a valid copy of the respective cache line is stored in another cache memory. Thus, the portion of a cache entry preserved for the state information of the cache line stored in the respective cache entry may only be configured to store the additional state IX, while the cache memory identifier identifying which other cache memory is likely to contain the valid copy of the cache line is stored in the portion of a cache entry originally preserved for the cache line itself. Thus, the portion of a cache entry originally preserved for the cache line itself is used to store part of the state information in case of an invalid cache line. Usually, the data comprised by an invalid cache line is not read. However, according to embodiments, the respective portion the cache entry may be preserved for the cache line itself only in case of a valid copy of the cache line. In case of an invalid copy, it may be preserved for the cache memory identifier. Thus, in case of cache line state IX, the data stored in the respective portion is read and the cache memory likely to contain a valid copy of the cache line is identified using the data read.

Embodiments may enable implementing a producer-consumer relation, wherein the producer modifies a cache line and the consumer reads the cache line. Both may each have their own cache, e.g. producer and consumer may be provided by two different processor chips or processor cores. The consumer may read a cache line using shared read. In response to receiving an exclusive request from the producer X, the state of the read cache line in the cache memory of the consumer may be changed from shared to invalid I(X) providing a cache memory identifier X identifying the cache memory of the producer to be likely to contain a valid copy of the cache line. Consequently, subsequent consumer read attempts will result in cache misses in view of its own cache memory, but using the cache memory identifier X may speed up filling the consumer's cache memory with a valid copy of the desired cache line from producer X's cache memory. A producer-consumer pattern may further be used to enable iteratively updates of a data structure comprising one or more cache lines distributed across processors. Each of the processors may act as a producer for those parts of the data structure it updates and each processor may act as a consumer for those parts of the data structure it reads.

According to embodiments, the updated state information in addition indicates that the copy of the cache line stored in the first cache memory is invalid.

According to embodiments, the logic circuitry is further operable for retrieving a valid copy of the cache line. The retrieving comprises sending a speculative request for retrieval of the valid copy of the cache line to the second cache memory identified by the cache memory identifier, in case no valid copy of the respective cache line is stored in the first cache memory. Embodiments may have the beneficial effect that even though the copy of the cache line is invalid, it may provide information in form of the cache memory identifier used for efficiently retrieving data.

According to embodiments, cache coherence of the multi-cache memory system is implemented using a cache coherence directory and the logic circuitry is further operable for sending a copy of the speculative request to the cache coherence directory, in case no valid copy of the respective cache line is stored in the first cache memory. Embodiments may have the beneficial effect of reducing the amount of bandwidth needed for implementing cache coherence compared with broadcast-based cache coherence. In case of broadcast-based cache coherence, the amount of inter-processor communication required for maintaining coherence in a multi-processor system may grow with $N^2$, where N is the number of processors.

On a local cache miss, i.e. in case a local cache memory only comprises an invalid copy of the desired cache line, the latency of retrieving a valid copy of the desired cache line may be reduced using a successful speculative request. On the other hand, in case of a misspeculation resource use is increases, but not the latency. In case of such a misspeculation, the speculative request is sent to the second cache memory in vain. However, the copy of the speculative request which is sent to the cache coherence directory may be processed and forwarded to a cache memory identified by the cache coherence directory to comprise a valid copy of the desired cache line or to the main memory. This may be identical with the way of retrieving a valid copy of a desired cache line in case no cache memory identifier is provided. Thus, the resulting latency is equal, while only the resource use is increases, due to the speculative request sent in vain to the second cache memory.

In a directory-based system, the data being shared is placed in a common cache coherence directory that maintains the coherence between cache memories. The cache coherence directory may act as a filter through which the processors of the system have to request permission to load a line, e.g. data line, from the main memory to one of the cache memories. Furthermore, the cache coherence directory may protocol movements of the respective data line or copies of the same between the cache memories and/or status changes of the respective data line or copies of the same. When the data line is amended, the cache coherence directory may either update or invalidate copies of the respective cache line stored in other cache memories.

Thus, the cache coherence directory may keep track of the valid cache lines comprised by the cache memories, e.g. the sharers sharing a shared cache line may be tracked.

The cache coherence directory may determine using the copy of the speculative request, whether the cache memory to which the speculative request has been sent currently indeed comprises a valid copy of the desired cache line. In case the cache memory to which the speculative request has been sent currently comprises a valid copy of the desired cache line, no additional steps are necessary to be performed by the cache coherence directory in order to successfully retrieve a valid copy of the desired cache line. However, in case the cache memory to which the speculative request has been sent currently does not comprises a valid copy of the desired cache line, the cache coherence directory may determine which cache memory actually comprises a valid copy of the desired cache memory and forward the speculative request to the determined cache memory.

According to embodiments, the cache coherence directory in response to receiving the copy of the speculative request from the first cache memory checks, whether the second cache memory contains a valid copy of the respective cache line, and may suppress sending an additional request from the directory to the second cache memory, in case a valid copy of the respective cache line is stored in the second cache memory. Embodiments may have the beneficial effect that performing redundant tasks by processing redundant requests may be avoided. In case the coherence directory determines that the second cache memory indeed contains a valid copy of the respective cache line, the speculative request sent to the second cache memory by the first cache memory will be successful in retrieving the valid copy of the respective cache line. Therefore, there is no need generate and/or sent an additional redundant request for retrieval of s valid copy of the respective cache line by the coherence directory.

According to embodiments, the first cache memory is comprised by a first chip and the second cache memory is comprised by a second chip. The speculative request is sent from the first cache memory to the second cache memory via a third chip. The third chip uses cut-through switching to forward the speculative request to the second cache memory.

Embodiments may have the beneficial effect of reducing the latency of transferring the speculative request from the first cache memory to the second cache memory via a third chip. Cut-through switching refers to a method of forwarding a data packet, like the speculative request, where the forwarding already starts before the entire packet has been received. The Forwarding may e.g. start as soon as the destination address is processed. Thus, the latency of transferring the data packet may be reduced. According to embodiments, the speculative request may comprise a routing tag identifying the second cache memory and/or the second processor chip as the destination address of the speculative request. The routing tag may be included at the beginning of the speculative request, e.g. in a header of the same. Embodiments may have the beneficial effect that by including the routing tag in the header of the speculative request, it is sufficient for the third chip to analyze the header of the speculative request for deciding to which chip the request is to be forwarded even before the entire request is received. Thus, a fast forwarding of the respective request is enable. In particular, the decision may be made before the request is received in its entirety.

According to embodiments, the third chip comprises the cache coherence directory. The third chip copies the speculative request, when forwarding the respective request to the second cache memory, and provides the resulting copy of the forwarded request to the cache coherence directory. Embodiments may have the beneficial effect that in case the speculative request is unsuccessful, the cache coherence directory may process the speculative request and sent it to a cache memory or a backing storage comprising a valid copy of the cache line.

According to embodiments, cache coherence of the multi-cache memory system is implemented using broadcasting. The retrieving further comprises broadcasting a request for retrieval of the valid copy of the cache line to the remaining cache memories of the multi-cache memory system, in case the speculative request sent to second cache memory fails. Embodiments may have the beneficial effect of enabling a higher application performance in case of broadcast-based coherence, due to a reduced use of resources in case of a successful speculation. In case of a cache miss, a speculative point-to-point request may be sent to the cache memory identified by the cache memory identifier to be likely to contain a valid copy of the cache line. In case the speculative request is successful only the cache memory identified by the cache memory identifier is involved in retrieving the valid copy of the desired cache line. Only in case of a speculation fail, the speculative is broadcasted and more cache memories are involved.

According to embodiments, the logic circuitry is further operable for receiving a further request for retrieval of a valid copy of a further cache line and for sending the valid copy of the requested further cache line in response to the received further request, in case the valid copy of the requested further cache line is stored in the first cache memory. Embodiments may have the beneficial effect that the logic circuitry may provide a valid copy of a requested cache line in response to a received request, in case the valid copy of the requested cache line is stored in the first cache memory.

According to embodiments, the logic circuitry is further operable for receiving a further speculative request for retrieval of a valid copy of the further cache line and for sending the valid copy of the requested further cache line in response to the received further speculative request, in case the valid copy of the requested further cache line is stored in the first cache memory. Embodiments may have the beneficial effect that the logic circuitry may provide a valid copy of a requested cache line in response to a received speculative request, in case the speculation is correct and a valid copy of the requested cache line is stored in the first cache memory.

According to embodiments, the logic circuitry is further operable for spilling a copy of a cache line stored in the first cache memory in order to free memory space in the first memory cache. The copy to be spilled is selected according to the following spilling order: if present, an invalid copy of a cache line is spilled with state information indicating that the respective copy stored in the first cache memory is invalid, where the state information comprises no cache memory identifier identifying a further cache memory of the multi-cache memory system that is likely to contain a valid copy of the respective cache line; else, if present, a least recently used invalid copy of a cache line is spilled with state information indicating that the respective copy stored in the first cache memory is invalid, where the state information comprises a cache memory identifier identifying a further cache memory of the multi-cache memory system that is likely to contain a valid copy of the respective cache line; else, if present, a valid copy of a cache line is spilled with state information indicating that the respective copy stored in the first cache memory is valid.

Embodiments may have the beneficial effect of ensuring that sufficient free memory space is available in the first cache memory for caching data. In case of a cache miss, the cache client, like e.g. a processor core or processor chip, may spill, i.e. remove, a line from the cache memory in order to free a cache entry of the cache memory for the uncached data which is retrieved from another memory cache or a backing storage, like e.g. a main memory, using a spilling, also referred to as replacement policy, to select the line to be spilled.

According to embodiments, the semiconductor circuit may be configured to implement any of the above identified features of the cache memory control device. For example, the cache memory control device may comprise the semiconductor circuit.

According to embodiments, the method may implement any of the controlling steps described above.

FIG. 1 depicts a computer system 100 which may comprise multiple cache memories. It will be appreciated that the methods described herein are automated by way of computerized systems, such as servers or embedded systems. These methods may further be implemented in software 112, 122 (including firmware 122), hardware (processor) 105, or a combination thereof. In exemplary embodiments, the methods described herein are implemented in software, as executable instructions, and may be used by a special or general-purpose digital computer, such as a personal computer, workstation, minicomputer, or mainframe computer. The most general system 100 therefore includes a general-purpose computer 101.

In exemplary embodiments, in terms of hardware architecture, as shown in FIG. 1, the computer 101 includes a processor 105, memory (main memory) 110 coupled to a memory controller 115, and one or more input and/or output (I/O) devices (or peripherals) 10, 145 that are communicatively coupled via a local input/output controller 135. The input/output controller 135 may be, but is not limited to, one or more buses or other wired or wireless connections, as is known in the art. The input/output controller 135 may have additional elements, which are omitted for simplicity, such as controllers, buffers, caches, drivers, repeaters, and receivers, to enable communications. Further, the local interface may include address, control, and/or data connections to enable appropriate communications among the aforementioned components. As described herein the I/O devices 10, 145 may generally include any generalized cryptographic card or smart card known in the art.

The processor 105 is a hardware device for executing software, particularly that stored in memory 110. The processor 105 may be any custom made or commercially available processor, a central processing unit (CPU), an auxiliary processor among several processors associated with the computer 101, a semiconductor based microprocessor (in the form of a microchip or chip set), a macroprocessor, or generally any device for executing software instructions. The processor 105 may comprise and/or be communicatively connected with one or more local cache memories. The processor 105 may comprise one or more processor cores. Each of the processor cores may be with one or more local cache memories. The processor 105 may be implemented in form of a plurality of processor chips, each processor chip may comprise one or more local cache memories. The cache memories may each comprise a cache memory controller for controlling the respective cache memory. In case of multiple cache memories, cache coherence may be implemented in form of directory-based cache coherence or broadcast-based cache coherence.

The memory 110 may include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM). Note that the memory 110 may have a distributed architecture, where various components are situated remote from one another, but may be accessed by the processor 105.

The software in memory 110 may include one or more separate programs, each of which comprises an ordered listing of executable instructions for implementing logical functions, notably functions involved in embodiments of this invention. In the example of FIG. 1, software in the memory 110 includes instructions or software 112.

The software in memory 110 shall also typically include a suitable operating system (OS) 111. The OS 111 essentially controls the execution of other computer programs, such as possibly software 112.

The methods described herein may be provided in the form of a source program 112, executable program 112 (object code), script, or any other entity comprising a set of instructions 112 to be performed. When being provided as a source program, then the respective program needs to be translated via a compiler, assembler, interpreter, or the like, which may or may not be included within the memory 110, so as to operate properly in connection with the OS 111. Furthermore, the methods may be written as an object-oriented programming language, which has classes of data and methods, or a procedure programming language, which has routines, subroutines, and/or functions.

In exemplary embodiments, a conventional keyboard 150 and mouse 155 may be coupled to the input/output controller 135. Other output devices such as the I/O devices 145 may include input devices, for example but not limited to a printer, a scanner, microphone, and the like. Finally, the I/O devices 10, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 145 may be any generalized cryptographic card or smart card known in the art. The system 100 may further include a display controller 125 coupled to a display 130. In exemplary embodiments, the system 100 may further include a network interface for coupling to a network 165. The network 165 may be an IP-based network for communication between the computer 101 and any external server, client and the like via a broadband connection. The network 165 transmits and receives data between the computer 101 and external systems 30, which may be involved to perform part or all of the steps of the methods discussed herein. In exemplary embodiments, network 165 may be a managed IP network administered by a service provider. The network 165 may be implemented in a wireless fashion, e.g., using wireless protocols and technologies, such as WiFi, WiMax, etc. The network 165 may also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, smart device or the like, the software in the memory 110 may further include a basic input output system (BIOS) 122. The BIOS is a set of essential software routines that initialize and test hardware at startup, start the OS 111, and support the transfer of data among the hardware devices. The BIOS is stored in ROM so that the BIOS may be executed when the computer 101 is activated.

When the computer 101 is in operation, the processor 105 is configured to execute software 112 stored within the memory 110, to communicate data to and from the memory 110, and to generally control operations of the computer 101 pursuant to the software. The methods described herein and the OS 111, in whole or in part, but typically the latter, are read by the processor 105, possibly buffered within the processor 105, and then executed. The storage 120 may comprise a disk storage such as HDD storage.

Figure 2:
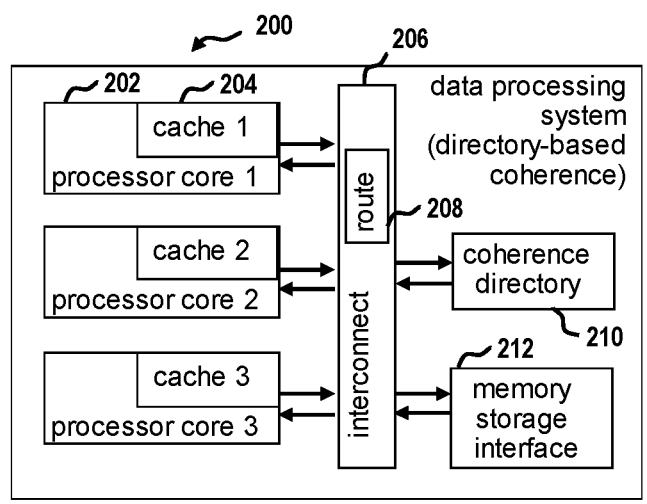
FIG. 2 depicts a schematic diagram of an exemplary multi-cache memory system.

FIG. 2 shows an exemplary multi-cache memory system 200 in form of a data processing system which implements directory-based coherence using a coherence directory 210. The multi-cache memory system 200 comprises a plurality of processor cores 202, each connected with a local cache memory 204. Data is exchanged between the cache memories 204 via an interconnect fabric 206, which comprises a routing module 208 for routing messages, like requests, received from the cache memories 204 via the processor cores 202. The interconnect fabric 206 further connects the cache memories 204 with the coherence directory 210. The coherence directory 210 keeps track of the content of the cache memories 204, i.e. the cache lines comprised by the same, thus implementing cache coherence. In addition, the interconnect fabric 206 connects the cache memories 204 to a memory storage interface 212. Via the memory storage interface 212 data may be received from and sent to a backing storage, like e.g. a main memory. In case e.g. processor core 2 tries to retrieve a cache line from cache memory 2 resulting in a cache miss, since cache memory 2 only comprises an invalid cache line with state information I(3) identifying cache memory 3 to be likely to contain a valid copy of the desired cache line, a speculative request for a valid copy of the desired cache line may be sent from cache memory 2 via interconnect fabric 206 to cache memory 3. Interconnect fabric 206 may in addition sent a copy of the speculative request to the coherence directory 210. In case cache memory 3 indeed comprises a valid copy of the desired cache line, the same is sent to the requesting cache memory 2 in response to the received speculative request. In case cache memory 3 indeed comprises a valid copy of the desired cache line, coherence directory 210 may suppress sending an additional request from the directory to the second cache memory and only record the cache line transfer from cache memory 3 to cache memory 2. In case cache memory 3 does not comprise a valid copy of the desired cache line, cache memory 3 may not respond to the request. However, coherence directory 210 may identify a storage location of a valid copy of the desired cache line and request the respective valid copy to be transferred to requesting cache memory 2.

FIG. 3 shows an exemplary cache entry state table. The state field of each cache entry may comprise one of the state information indicated in the first column. These states correspond an extended MESI protocol, which in addition to the known states M, E, S and I comprises states I(1), I(2), and I(3). State I(1) identifies an invalid cache line comprised by the respective cache entry, wherein a valid copy of this cache line is likely to be contained by cache memory 1. State I(2) identifies an invalid cache line comprised by the respective cache entry, wherein a valid copy of this cache line is likely to be contained by cache memory 2, and state I(3) identifies an invalid cache line comprised by the respective cache entry, wherein a valid copy of this cache line is likely to be contained by cache memory 3. In order to implement this extended MESI protocol for a multi-cache memory system comprising three cache memories a 3-bit value is sufficient.

Figure 4:
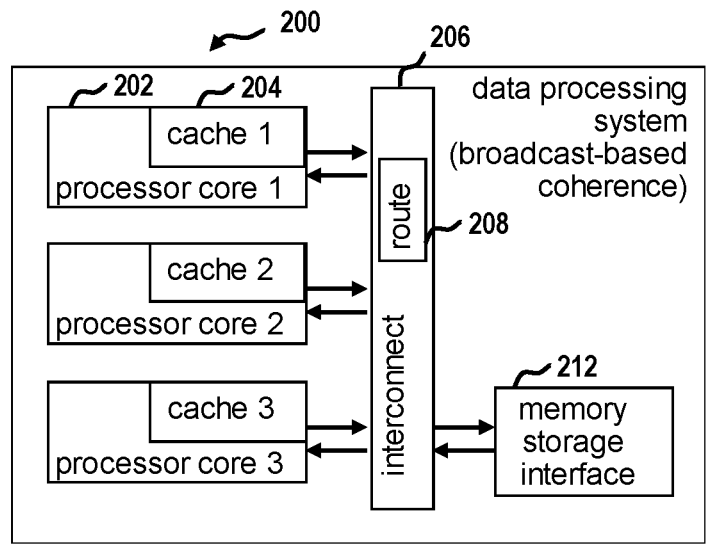
FIG. 4 depicts a schematic diagram of an exemplary multi-cache memory system.

FIG. 4 shows an exemplary multi-cache memory system 200 in form of a data processing system comprising a plurality of processor cores 202 each provided with a local cache memory 204. Cache coherence is implemented based on broadcasting. In contrast to the multi-cache memory system of FIG. 2, the multi-cache memory system 200 comprises no coherence directory. In case cache memory 3 does not comprise a valid copy of a desired cache line requested by cache memory 2 using a speculative request, cache memory 2 may broadcast a request for retrieving a valid copy of a desired cache line to all the remaining memory caches or at least a subset of the same, e.g. cache memory 1. In this case, each of the memory caches receiving such a request may have to response to the same.

Figure 5:
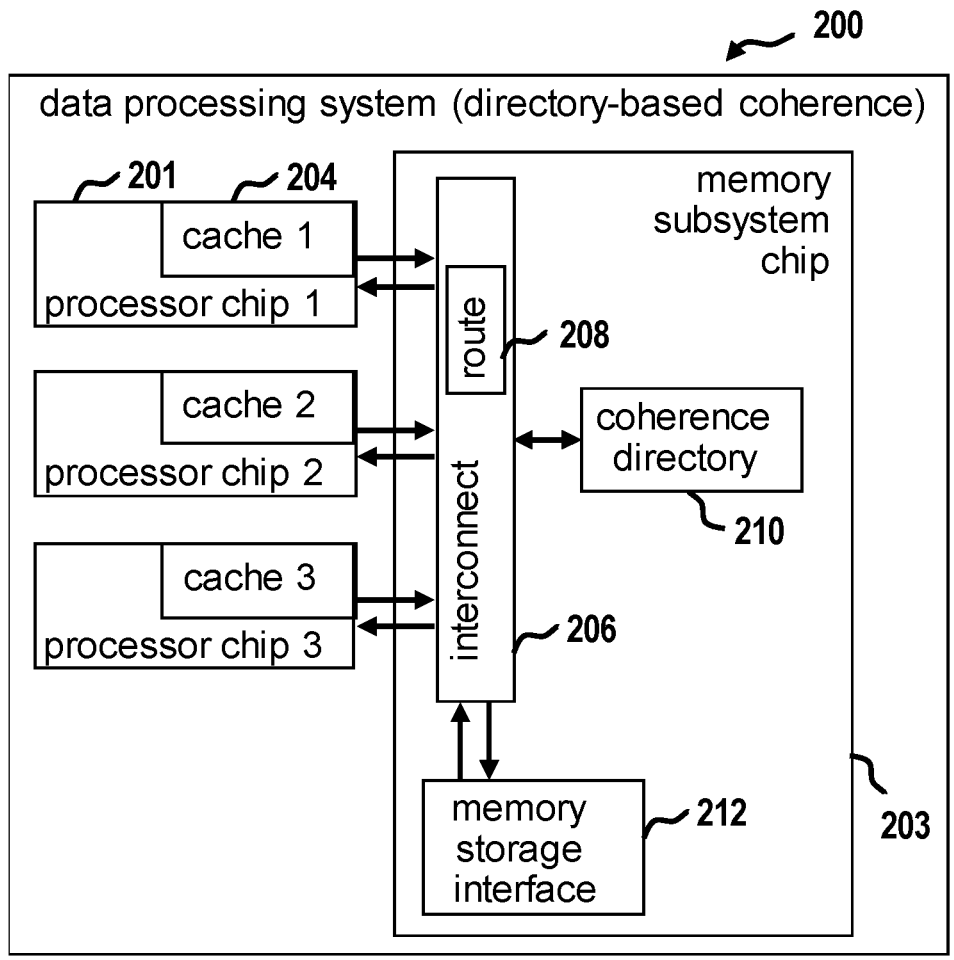
FIG. 5 depicts a schematic diagram of an exemplary multi-cache memory system.

FIG. 5 shows an exemplary shows an exemplary multi-cache memory system 200 in form of a data processing system comprising a plurality of processor chips 201. Each processor chip is provided with a local cache memory 204. Cache coherence of the cache memories 204 is implemented using coherence directory 210 provided by a memory subsystem chip 203. The memory subsystem chip 203 further provides an interconnect fabric 206 with a routing module 208 enabling communication between the cache memories 204, the coherence directory 210 and a memory storage interface 212. The memory storage interface 212 may e.g. be provided by the memory subsystem chip 203. Retrieving a valid copy of a desired cache line may be performed analogously to the method of FIG. 2.

Figure 6:
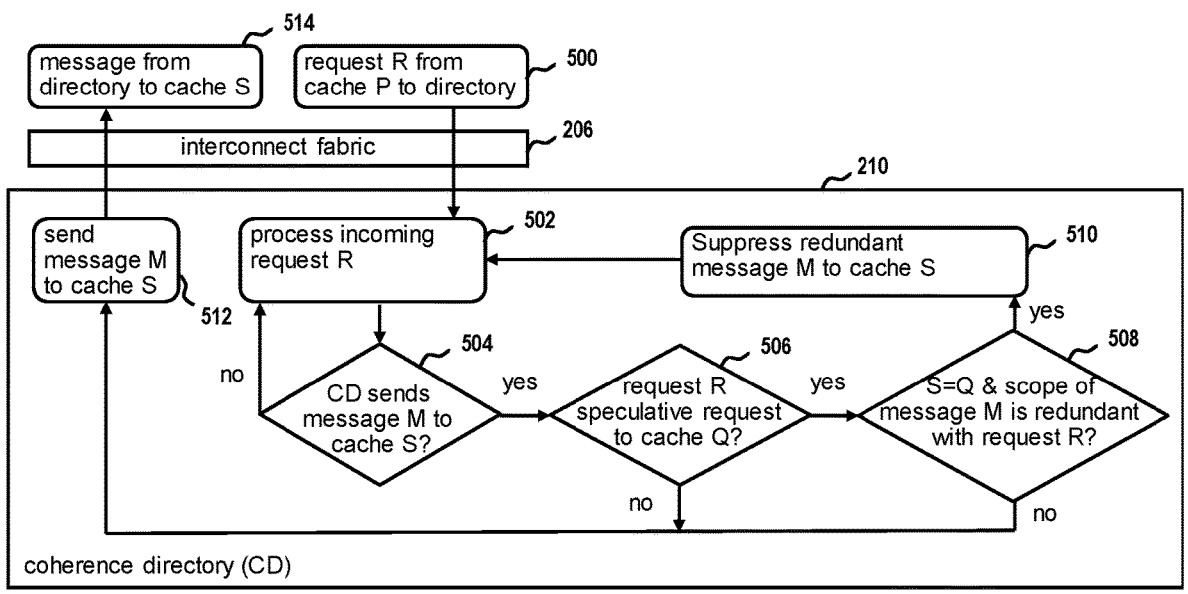
FIG. 6 depicts a schematic diagram of an exemplary method of invalidating a copy of a cache line.

FIG. 6 shows an exemplary method for invalidating a cache line in a cache entry table 207 provided by a cache memory 204 of a multi-cache memory system 200. In step 300, the method starts with receiving a request 302 for retrieval of a cache line with address tag "abc" from interconnect fabric 206 by a processor core 202. The request 302 may comprise a cache memory identifier 304 identifying a cache memory requesting the respective cache line. The request 302 is forwarded to a cache controller 205 of cache memory 204. In step 306, the cache controller 205 checks, whether the requested cache line is to be invalidated. In case the requested cache line is not to be invalidated, the method may continue with step 314 replying to request 302 by the cache controller 205. In case the requested cache line is to be invalidated, in step 308, it is checked whether the request 302 comprises a cache memory identifier 304. In case the request 302 comprises no cache memory identifier 304, the state of cache line "abc" is set to "I" in step 312 and the method continues with step 314. In case the request 302 comprises a cache memory identifier 304 identifying cache memory k to be likely to contain the requested cache line in the near future, the state of cache line "abc" is set to "I(k)" in step 312 and the method continues with step 314. State "I(k)" identifies cache line "abc" to be invalid, but indicates that cache memory k is likely to contain a valid copy of cache line "abc". The method ends with sending the reply in step 316 via the interconnect to the requesting cache memory, e.g. cache memory k.

Figure 7:
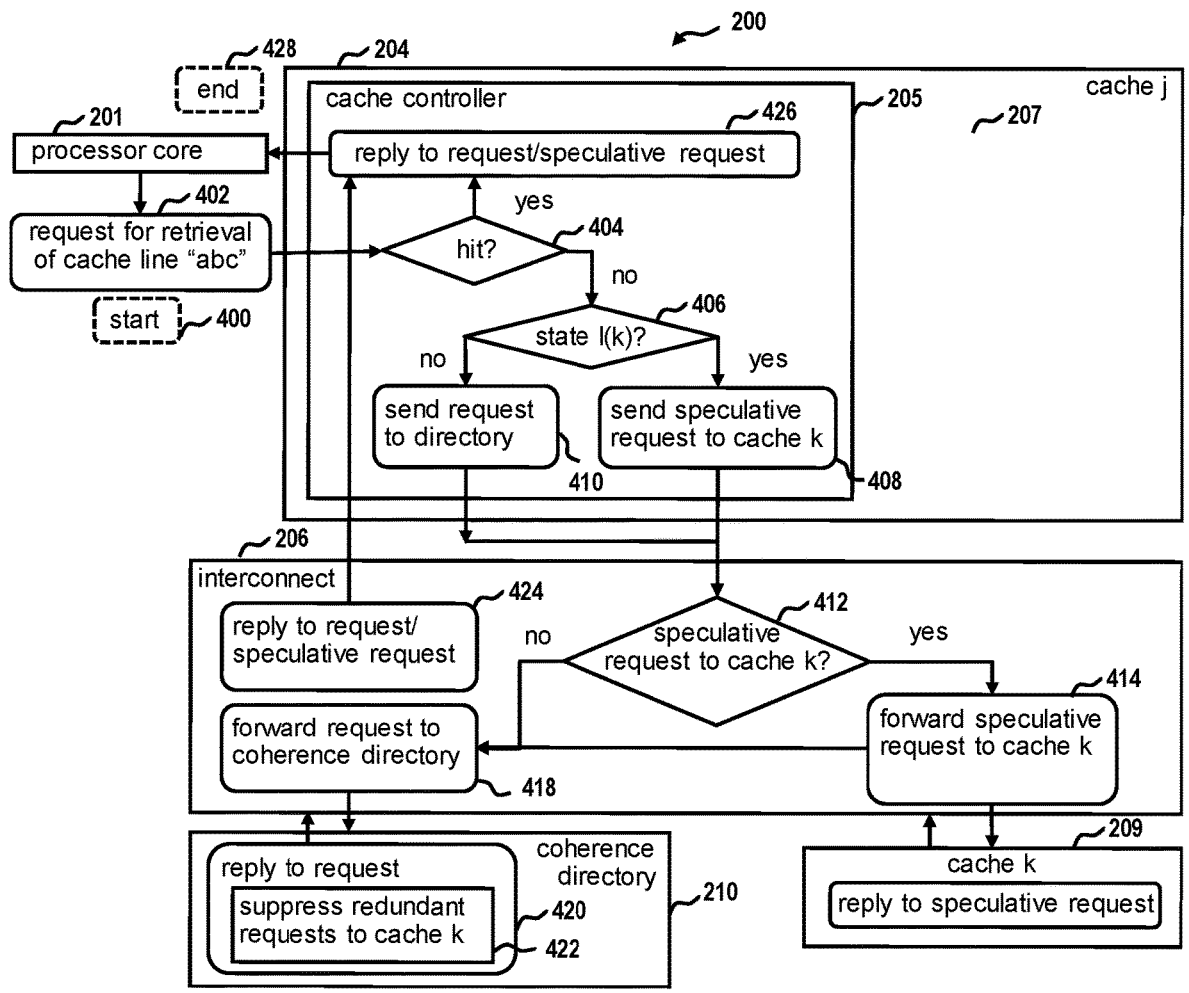
FIG. 7 depicts a schematic diagram of an exemplary method of retrieving a valid copy of a cache line.

FIG. 7 shows an exemplary of requesting a cache line. The method starts in step 400 with processor core 201 sending a request 401 for cache line "abc" to a local cache memory j 204 of a multi-cache memory system 200. In step 404, a cache controller 205 of cache memory j checks, whether the request 402 results in a cache hit, i.e. whether cache entry table 207 comprises a valid cache line with address tag "abc". In case a cache hit occurs, the method continues in step 426 with replying to the request, i.e. providing the requested cache line. In case no cache hit occurs, the method continues in step 406 checking, whether the state information of the invalid cache line "abc" comprises a cache memory identifier identifying a cache memory likely containing a valid copy of the requested cache line. In case no cache memory identifier is provided the method continues in step 410 with sending a request for retrieving a valid copy of the cache line "abc" to the coherence directory 210 via the interconnect fabric 206. The interconnect fabric 206 checks in step 412, whether a received request is a speculative request. In case the received request is no speculative request, the method continues in step 418 with forwarding the request to the coherence directory. The coherence directory replies to the request in step 420. In case the coherence directory 210 determines that a speculative request has already been send to the correct cache memory, i.e. a cache memory comprising a valid copy of the requested cache line, the coherence directory 210 may suppress sending an additional request from the directory to the second cache memory. Else the reply to the request may comprise retrieving a valid copy of the requested cache line for the requesting processor core 201. In step 424 a reply to the request comprising a valid copy of the requested cache line is sent via the interconnect fabric 206 to the cache controller which may forward the reply in step 426 to the processor core 201. The method ends with receiving a reply to the request by the requesting processor core in step 428.

In case the state information of the invalid cache line "abc" comprises a cache memory identifier identifying a cache memory likely containing a valid copy of the requested cache line, a speculative request is sent to the identified cache memory k in step 408. In step 412 the interconnect fabric 206 determines that the received request is a speculative request and sands the same to the cache memory k 209. The cache memory k 209 replies to the speculative request in case it comprises a valid copy of the requested cache line. In case it does not comprise a copy of the requested cache line, it may not reply to the speculative request. The reply is forwarded via steps 424 and 426 to the requesting processor core 201.

In step 414, a copy of the speculative request to cache k may be forwarded to the coherence directory 210. In case the coherence directory determines that the speculative request has been sent to the correct cache memory, the coherence directory 210 may suppress sending an additional request from the directory to the second cache memory. In case the speculative request has been sent to a cache memory not containing a valid copy of the requested cache line, the coherence directory may generate a request for the same cache line "abc" as the speculative request and sent it to the correct cache memory in step 420. In reply to this request, a valid copy of the requested cache line may be sent to the requesting processor core via steps 424 and 426.

Figure 8:
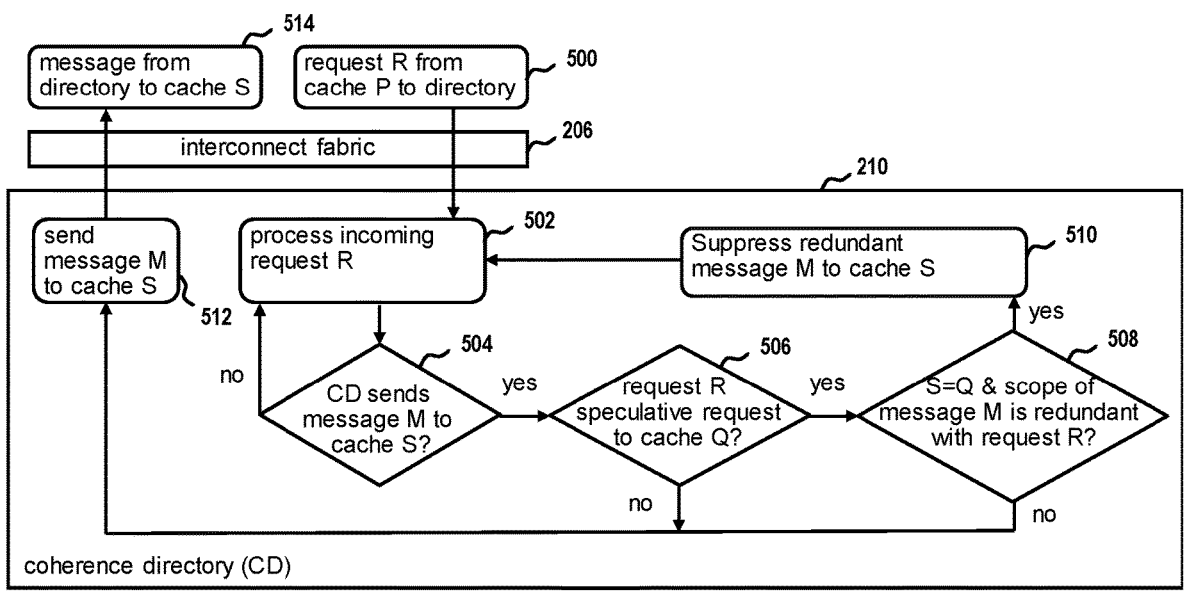
FIG. 8 depicts a schematic diagram of an exemplary method of retrieving a valid copy of a cache line.

FIG. 8 shows an exemplary diagram of the method performed by the coherence directory in steps 420, 422 of FIG. 7 in more detail. In step 500, a request R from a cache memory P is sent to the coherence directory 210 via the interconnect fabric 206. In step 502, the incoming request 502 is processed. In step 504, it is checked, whether a message M has to be sent to cache S in order to be able to retrieve a valid copy of a cache line requested by request R. If this is not the case, the processing 502 is continued. In case, a message M has to be sent to cache S in order to be able to retrieve the valid copy, in step 506 it is checked, whether the request R is a speculative request to cache Q. In case the request R is no speculative request to cache Q, the message M is indeed sent to cache S for retrieving the valid copy in step 514. In case the request R is a speculative request, it is checked in step 508, whether the cache S containing the valid copy is identical with the cache Q and whether the scope of the message M is redundant with the speculative request R. In case the scope is not redundant, the method continues with step 512. In case the scope is redundant, the redundant message M to cache S=Q is suppressed in step 510 and the processing of request R is finished in step 502.

Figure 9:
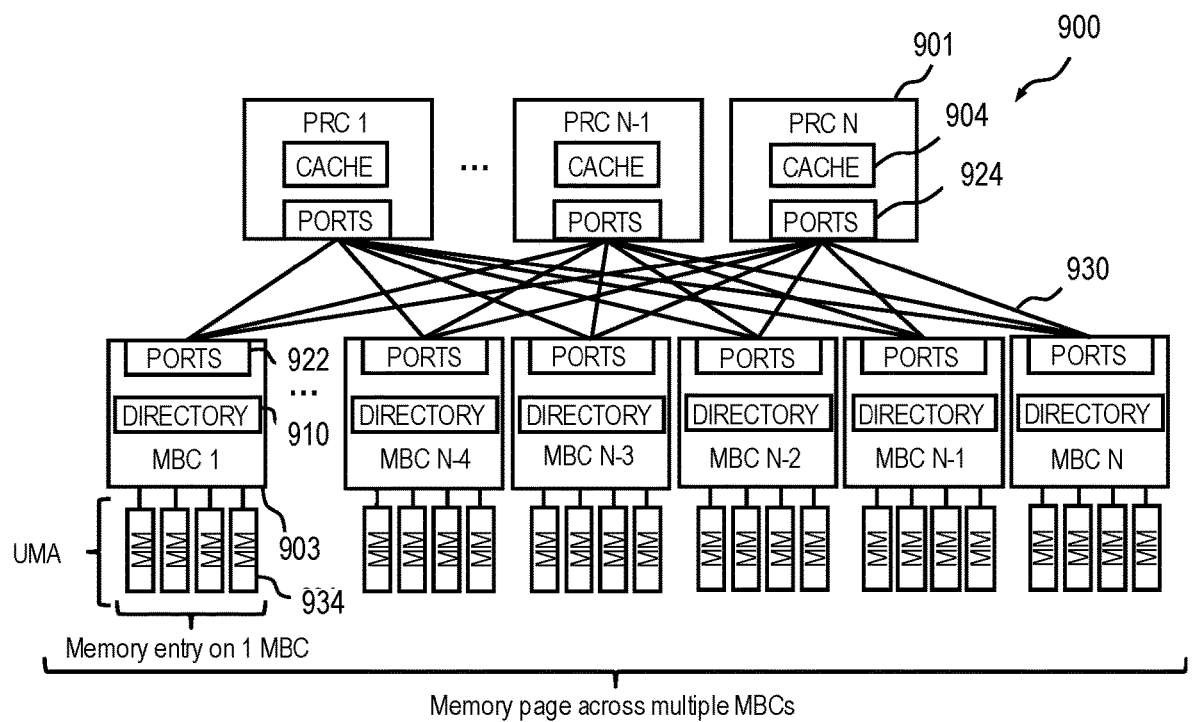
FIG. 9 depicts a schematic diagram illustrating an exemplary multi-processor architecture implementing a multi-cache memory system.

FIG. 9 shows an exemplary multi-processor architecture in form of a multi-processor computer system, like e.g. a multi-processor server 900 comprising multiple processor chips 901. The multi-processor server 900 comprises a set of memory buffer chips 903. Each processor chip 901 may be provided with a plurality of ports 924. According to an embodiment the number of ports 924 provided per processor chip 901 may equal the number of memory buffer chips 903. Each processor chip 901 is provided with a local cache memory 904 for caching memory lines, i.e. cache lines, to be processed by the processor chip 901. The processor chips 901 of the server 900 may or may not be configured identically. Application software may be executed on one or more processor chips 901 and thus a given application may implicitly or explicitly exploit and benefit from similar or different processor chips 901.

Each memory buffer chip 903 may be provided with a plurality of local memory modules 934, e.g. dual in-line memory modules (DIMM) comprising a series of dynamic random-access memory integrated circuits. Thus, each memory buffer chip 903 implements a memory hub device. Furthermore, each memory buffer chip 903 may comprise a plurality of ports 922. For example, the number of ports 922 per memory buffer chip 903 may be equal to the number of processor chips 901. In addition, for memory lines stored in the memory modules 236 local to the respective memory buffer chip 903, each memory buffer chip 903 may comprise a coherence directory 910 for implementing directory-based coherence for cache lines stored in the cache memories 904 of one or more processor chips 901. For the set of memory buffer chips 903 of the server 900, all the memory buffer chips 20 may be configured identically or similarly with each memory buffer chips 903 performing similar functions. Application software may be executed on one or more processor chips 901 and thus performance of a given application typically benefits from memory being served by many and similar memory buffer chips 903, with each particular memory address being served by a single predefined memory buffer chip 903.

Each processor chip 901 may be communicatively coupled with each memory buffer chip 903 e.g. via a bidirectional point-to-point communication connection 930, for example a serial communication connection. Thus, each processor chip 901 may be provided with memory access to each of the memory modules 934 local to one of the memory buffer chips 903. The access to the memory modules 236 may be provided based on a uniform memory access (UMA) architecture. A given memory line, i.e. cache line, may be stored on one or more memory modules 236 as a backing storage, i.e. main memory, local to the same memory buffer chips 903. A given memory page comprising a plurality of memory lines may e.g. be interleaved across the memory modules 236 of all memory buffer chips 903.

The computer system may for example comprise 16 processor chips 901 and 128 memory buffer chips 903. In this case, each processor chip 901 may comprise 128 ports 924 in order to be communicatively coupled to each of the memory buffer chips 903. Furthermore, each of the memory buffer chips 903 may be provided with 16 ports 922 such that each memory buffer chip 903 may be communicatively coupled to each processor chip 901 via a distinct point-to-point communication connection 930.

It is understood that one or more of the aforementioned embodiments of the invention may be combined as long as the combined embodiments are not mutually exclusive. Ordinal numbers, like e.g. 'first' and 'second', are used herein to indicate different element assigned with the same name, but do not necessarily establish any order of the respective elements.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the 'C' programming language or similar programming languages. The computer readable program instructions may execute entirely on the user computer system's computer, partly on the user computer system's computer, as a stand-alone software package, partly on the user computer system's computer and partly on a remote computer or entirely on the remote computer or server. In the latter scenario, the remote computer may be connected to the user computer system's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A cache memory control device for controlling a first cache memory of a multi-cache memory system, the cache memory control device comprising logic circuitry operable for:

storing state information assigned to an invalid copy of a cache line stored in the first cache memory, wherein the state information comprises an indication that the cache line is invalid and also comprises a cache memory identifier identifying an individual second cache memory of the multi-cache memory system that is likely, based on a determination that the individual second cache memory contained a valid copy of the cache line, to contain the valid copy of the cache line, and wherein the multi-cache memory system comprises one or more processors, and wherein each of the one or more processors comprises multiple cache memories; and spilling a copy of a cache line stored in the first cache memory in order to free memory space in the first memory cache, wherein the copy to be spilled is, if present, an invalid copy of a cache line with state information indicating that the respective copy stored in the first cache memory is invalid, wherein the state information comprises no cache memory identifier identifying a further cache memory of the multi-cache memory system that is likely to contain a valid copy of the respective cache line.

2. The device of claim 1, wherein the logic circuitry is further operable for providing the invalid copy of the cache line with the assigned state information, wherein the providing comprises:

invalidating a valid copy of the cache line stored in the first cache memory upon receipt of a predefined command, wherein the valid copy of the cache line is assigned with a state information indicating that the respective copy of the cache line stored in the first cache memory is valid;

determining using the received predefined command the second cache memory that is likely to contain the valid copy of the cache line after invalidation of the copy of the cache line stored in the first cache memory; and updating the state information of the invalidated copy of the cache line with the cache memory identifier identifying the second cache memory.

3. The device of claim 2, wherein the updated state information in addition indicates that the copy of the cache line stored in the first cache memory is invalid.

4. The device of claim 1, wherein the logic circuitry is further operable for retrieving a valid copy of the cache line, wherein the retrieving comprises sending a speculative request for retrieval of the valid copy of the cache line to the second cache memory identified by the cache memory identifier, in case no valid copy of the respective cache line is stored in the first cache memory.

5. The device of claim 4, wherein cache coherence of the multi-cache memory system is implemented using a cache coherence directory and wherein the logic circuitry is further operable for sending a copy of the speculative request to the cache coherence directory, in case no valid copy of the respective cache line is stored in the first cache memory.

6. The device of claim 5, wherein the cache coherence directory in response to receiving the copy of the speculative request from the first cache memory checks, whether the second cache memory contains a valid copy of the respective cache line, and suppresses sending an additional request from the directory to the second cache memory, in case a valid copy of the respective cache line is stored in the second cache memory.

7. The device of claim 4, wherein the first cache memory is comprised by a first chip and the second cache memory is comprised by a second chip, wherein the speculative request is sent from the first cache memory to the second cache memory via a third chip which uses cut-through switching to forward the speculative request to the second cache memory.

8. The device of claim 7, wherein the third chip comprises the cache coherence directory, copies the speculative request, when forwarding the respective request to the second cache memory, and provides the resulting copy of the forwarded request to the cache coherence directory.

9. The device of claim 4, wherein cache coherence of the multi-cache memory system is implemented using broadcasting and wherein the retrieving further comprises broadcasting a request for retrieval of the valid copy of the cache line to the remaining cache memories of the multi-cache memory system, in case the speculative request sent to second cache memory fails.

10. The device of claim 1, wherein the logic circuitry is further operable for receiving a further request for retrieval of a valid copy of a further cache line and for sending the valid copy of the requested further cache line in response to the received further request, in case the valid copy of the requested further cache line is stored in the first cache memory.

11. The device of claim 1, wherein the logic circuitry is further operable for receiving a further speculative request for retrieval of a valid copy of the further cache line and for sending the valid copy of the requested further cache line in response to the received further speculative request, in case the valid copy of the requested further cache line is stored in the first cache memory.

12. The device of claim 1, wherein the logic circuitry is further operable for spilling a copy of a cache line stored in the first cache memory in order to free memory space in the first memory cache, wherein the copy to be spilled is selected according to the following spilling order:

if present, an invalid copy of a cache line is spilled with state information indicating that the respective copy stored in the first cache memory is invalid, wherein the state information comprises no cache memory identifier identifying a further cache memory of the multi-cache memory system that is likely to contain a valid copy of the respective cache line;

else, if present, a least recently used invalid copy of a cache line is spilled with state information indicating that the respective copy stored in the first cache memory is invalid, wherein the state information comprises a cache memory identifier identifying a further cache memory of the multi-cache memory system that is likely to contain a valid copy of the respective cache line;

else, if present, a valid copy of a cache line is spilled with state information indicating that the respective copy stored in the first cache memory is valid.

13. A semiconductor circuit for controlling a first cache memory of a multi-cache memory system, the semiconductor circuit being operable for:

storing state information assigned to an invalid copy of a cache line stored in the first cache memory, wherein the state information comprises an indication that the cache line is invalid and also comprises a cache memory identifier identifying an individual second cache memory of the multi-cache memory system that is likely, based on a determination that the individual second cache memory contained a valid copy of the cache line, to contain the valid copy of the cache line, and wherein the multi-cache memory system comprises one or more processors, and wherein each of the one or more processors comprises multiple cache memories; and spilling a copy of a cache line stored in the first cache memory in order to free memory space in the first memory cache, wherein the copy to be spilled is, if present, an invalid copy of a cache line with state information indicating that the respective copy stored in the first cache memory is invalid, wherein the state information comprises no cache memory identifier identifying a further cache memory of the multi-cache memory system that is likely to contain a valid copy of the respective cache line.

14. The semiconductor circuit of claim 13, wherein the semiconductor circuit is further operable for providing the invalid copy of the cache line with the assigned state information, wherein the providing comprises:
invalidating a valid copy of the cache line stored in the first cache memory upon receipt of a predefined command, wherein the valid copy of the cache line is assigned with a state information indicating that the respective copy of the cache line stored in the first cache memory is valid;
determining using the received predefined command the second cache memory that is likely to contain the valid copy of the cache line after invalidation of the copy of the cache line stored in the first cache memory; and
updating the state information of the invalidated copy of the cache line with the cache memory identifier identifying the second cache memory.

15. The semiconductor circuit of claim 13, wherein the semiconductor circuit is further operable for retrieving a valid copy of the cache line, wherein the retrieving comprises sending a speculative request for retrieval of the valid copy of the cache line to the second cache memory identified by the cache memory identifier, in case no valid copy of the respective cache line is stored in the first cache memory.

16. A method for controlling a first cache memory of a multi-cache memory system, the method comprising:
storing state information assigned to an invalid copy of a cache line stored in the first cache memory, wherein the state information comprises an indication that the cache line is invalid and also comprises a cache memory identifier identifying an individual second cache memory of the multi-cache memory system that is likely, based on a determination that the individual second cache memory contained a valid copy of the cache line, to contain the valid copy of the cache line, and wherein the multi-cache memory system comprises one or more processors, and wherein each of the one or more processors comprises multiple cache memories; and
spilling a copy of a cache line stored in the first cache memory in order to free memory space in the first memory cache, wherein the copy to be spilled is, if present, an invalid copy of a cache line with state information indicating that the respective copy stored in the first cache memory is invalid, wherein the state information comprises no cache memory identifier identifying a further cache memory of the multi-cache memory system that is likely to contain a valid copy of the respective cache line.

17. The method of claim 16, wherein the method further comprises providing the invalid copy of the cache line with the assigned state information, wherein the providing comprises:
invalidating a valid copy of the cache line stored in the first cache memory upon receipt of a predefined command, wherein the valid copy of the cache line is assigned with a state information indicating that the respective copy of the cache line stored in the first cache memory is valid;
determining using the received predefined command the second cache memory that is likely to contain the valid copy of the cache line after invalidation of the copy of the cache line stored in the first cache memory; and
updating the state information of the invalidated copy of the cache line with the cache memory identifier identifying the second cache memory.

18. The method of claim 16, wherein the method further comprises retrieving a valid copy of the cache line, wherein the retrieving comprises sending a speculative request for retrieval of the valid copy of the cache line to the second cache memory identified by the cache memory identifier, in case no valid copy of the respective cache line is stored in the first cache memory.

\* \* \* \* \*